United States Patent

[11] 3,602,158

| [72] | Inventor | Boyd T. Skaggs<br>Ravenna, Ohio |
|---|---|---|
| [21] | Appl. No. | 830,982 |
| [22] | Filed | June 6, 1969 |
| [45] | Patented | Aug. 31, 1971 |
| [73] | Assignee | Container Corporation of America<br>Chicago, Ill. |

[54] PAPERBOARD PALLET RUNNER
5 Claims, 4 Drawing Figs.

[52] U.S. Cl. .................................................. 108/56,
108/5 B
[51] Int. Cl. ..................................................... B65d 19/00
[50] Field of Search............................................ 108/51–58

[56] References Cited
UNITED STATES PATENTS

| 3,000,603 | 9/1961 | Hermann........................ | 108/56 |
| 3,041,029 | 6/1962 | Brown............................ | 108/56 X |
| 3,006,590 | 10/1961 | Hoag.............................. | 108/56 |
| 3,131,656 | 5/1964 | Houle............................. | 108/56 |
| 3,167,038 | 1/1965 | Brown............................ | 108/56 |
| 3,393,646 | 7/1968 | Giacohe ......................... | 108/52 |
| 3,425,367 | 2/1969 | Oravez........................... | 108/51 |

*Primary Examiner*—Bobby R. Gay
*Assistant Examiner*—Glenn O. Finch
*Attorney*—Carpenter, Ostis and Lindberg ABSTRACT: A paperboard pallet runner formed from a cut and scored sheet which is folded and secured to a pallet deck beneath the same. The runners are spaced apart and have spaced side openings therein, so that the resulting pallet may be entered by the tines of a forklift truck from four different directions.

It is a principal object of this invention to provide a pallet runner formed from a cut and scored sheet of paperboard, and to provide in the sidewalls of such a runner a plurality of spaced openings, so that when the runners are secured in spaced relationship to the underside of a pallet deck, the resulting pallet may be entered from four different directions by the tines of a lift truck.

The structure according to the present invention constitutes an improvement over Hermann, U.S. Pat. No. 3,000,603, which shows a pallet runner wholly lacking in openings as disclosed in this application and for the purpose as set forth herein.

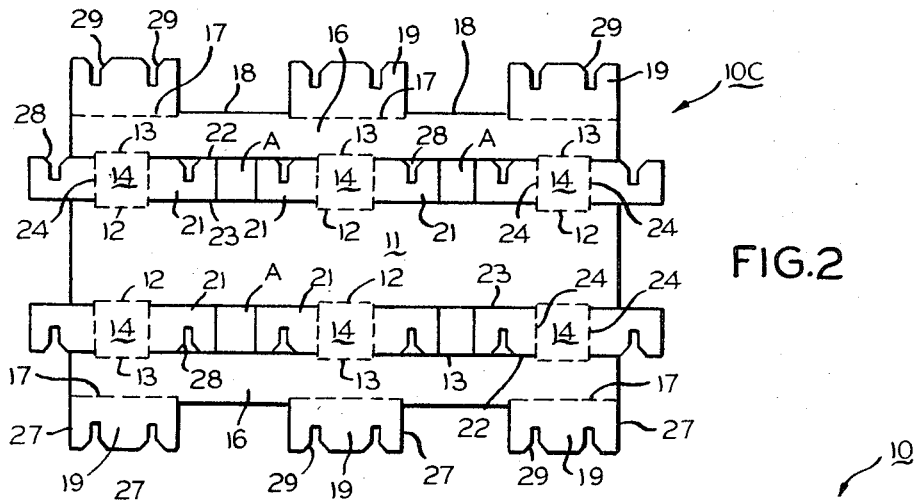
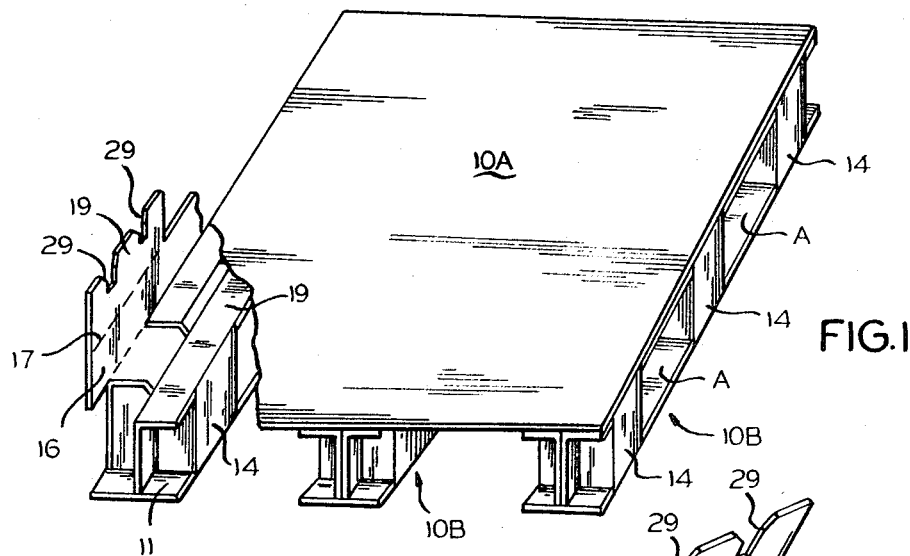
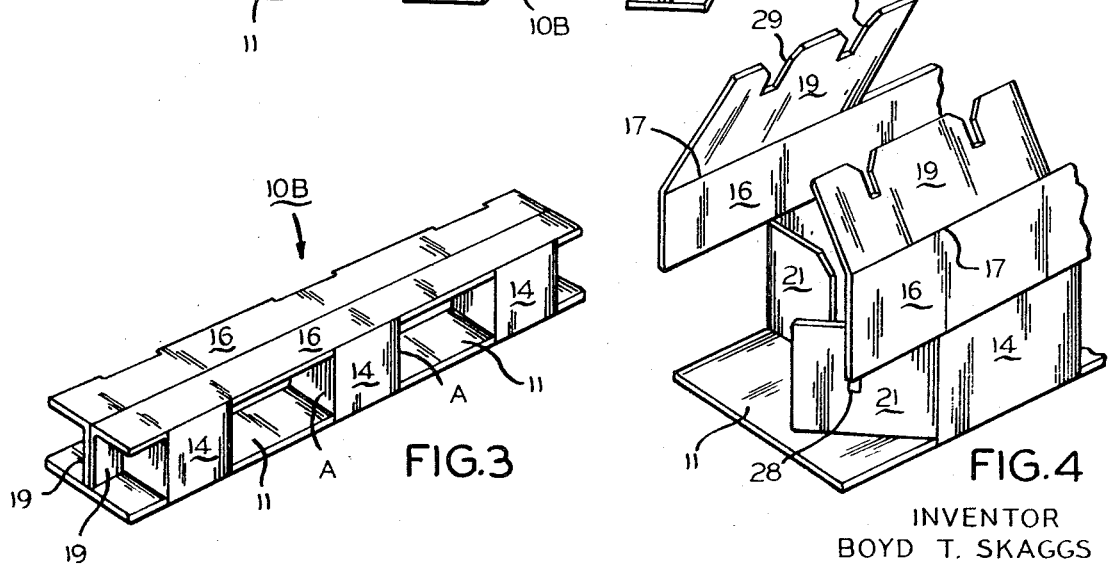
INVENTOR
BOYD T. SKAGGS

PAPERBOARD PALLET RUNNER

DRAWING

FIG. 1 is an isometric view showing the pallet runner according to the present invention in the environment of a four way pallet;

FIG. 2 is a plan view of a cut and scored paperboard blank from which the pallet runner may be formed;

FIG. 3 is an isometric view showing the completed pallet runner; and

FIG. 4 is a detailed isometric view showing the manner in which the elements thereof are folded to position.

SPECIFICATION

FIG. 1 shows a pallet 10 having a pallet deck 10A which has secured to the underside thereof a plurality of pallet runners 10B, these being spaced from each other so that the tines of a fork lift truck may be inserted there between for the lifting of the pallet deck. The pallet runners 10B also have transverse openings so that the tines may enter from lateral directions.

The pallet 10 may also have a lower pallet deck, not shown, for stiffness thereof. The pallet deck 10A may be made of plywood or high-strength corrugated of a number of plies. Irrespective of the type of pallet deck 10A employed, or whether it has a lower deck, the runners 10B are glued or stitched thereto as may be selected.

The pallet runners 10B are each formed from a cut and scored paperboard blank 10C as seen in FIG. 2. Paperboard blank 10C consists of a base panel 11 defined by a pair of spaced first score lines 12. Second score lines 13 spaced from the first score lines 12 define wall elements 14.

Upper panel portions 16 flank wall elements 14 and are connected thereto along the score lines 13. The upper panel portions 16 are additionally defined by blank edges 18 and by score lines 17 hingedly connecting marginal portions 19 thereto.

Inwardly extending flaps 21 are defined by cut lines 22 and 23 which are coextensive, substantially, with the score lines 12 and 13 defining the wall portions 14. The inwardly extending flaps 21 are foldably connected along score lines 24 to the wall portions 14.

Apertures A are located between contiguous inwardly extending flaps 21, and when the latter are folded inward, apertures A are provided in the pallet runner 10B as seen more clearly in FIGS. 1 and 3. Apertures A enable the tines of a forklift truck to enter the pallet 10 from a direction at right angles to the direction between the pallet runners 10B.

The marginal portions 19 are defined by blank edges 27 of the blank 10C and by the score lines 17. The inwardly extending flaps 21 are each provided with a notch 28 which cooperates with notches 29 and the marginal portions 19 as will now be described Flaps 21 overlap each other with the notches 28 in register to cooperate with the notches 29 of marginal portions 19.

In forming a pallet runner as seen in FIGS. 3 and 4 the upstanding wall portions 14 are folded into position upward from the base panel 11. Thereafter the inward extending flaps 21 are folded as seen in FIG. 1. Thereafter the upper panel portions 16 are folded over the inwardly extending flaps 21, the marginal portions 19 thereof being folded down as seen in FIGS 1 and 3 with the notches 29 of the marginal portion 19 interengaged with the notches 28 of the inwardly extending flaps 21. It may be noted that the notches 28 and 29 in each case extend but half the width of the flap 21 or the marginal portion 19 as the case may be.

By reason of the inturned flaps 21 good bearing is had on the base panel 11 and also against the underside of the panel deck 10A thereby lending good stiffness to the pallet runner 10B. Also, by reason of the marginal portions 19 being turned in the manner described the additional stiffness is given to the wall portions 14 to prevent the collapse thereof.

When the assembly has been constructed in the fashion as described, each of the pallet runners is in the form of a polygonal shaped tube essentially in the shape of a pair of side-by-side rectangles. When the assembly as seen in FIG. 3 is completed it may be glued or otherwise secured to the underside of the pallet deck 10A. In the same fashion the base panel 11 may be secured to a lower pallet deck, not shown.

I claim:

1. A blank adapted to be cut, scored and folded to define a pallet structure, said blank having:
   a central pair of parallel spaced fold lines;
   a second pair of fold lines spaced outwardly from said first pair of fold lines;
   a third pair of fold lines spaced outwardly and parallel to said second pair of fold lines;
   the distance between said second and third fold lines being approximately equal to half the distance between said first pair of fold lines;
   marginal portions of said blank lying outwardly of said third pair of fold lines being approximately equal in width to the width between said first and second fold lines;
   the portion of the blank between said first and second fold lines having:
      confronting flaps defined by spaced cut lines and score lines extending between said first and second fold lines; the distance from said score lines to the distal edge of each of said flaps being more than one-half the distance between said first pair of fold lines so as to be in overlapping relationship;
      a slot in each of said flaps;
   a pair of slots in each of said marginal portions.

2. The blank of claim 1, wherein the slots in said confronting flaps extend approximately one-half the distance between the cut lines defining same.

3. The blank of claim 1, wherein the slots in said marginal portions extend approximately one-half the width thereof.

4. The blank of claim 1, wherein apertures are defined by said spaced cut lines and said first and second fold lines to provide entrance for the tines of lift truck.

5. In a pallet deck and runner therefor, a pallet runner in the form of a polygonal-shaped tube folded from a unitary cut and scored paperboard blank, said runner comprising:
   a. a bottom panel defined by a pair of spaced parallel fold lines;
   b. a plurality of outer sidewalls extending upwardly from said bottom panel at said fold lines;
   c. a top wall element foldably connected to each of said sidewalls;
   d. each of said sidewalls including apertures therein defined by inturned flaps extending between said bottom panel and said top wall element and extending inward more than one-half the width of said base panel for stiffening the sidewalls in the vertical plane;
   e. said top wall element being adapted to be folded into position atop a corresponding inturned flap and to bear thereon;
   f. a plurality of marginal portions foldably connected to each of said top wall elements;
   g. each of said marginal portions being adapted to be folded into a position of engagement with said inturned flaps.